March 22, 1955

C. B. SPASE 2,704,467

VIBRATION BALANCER

Filed Aug. 21, 1953

INVENTOR.
Charles B. Spase
BY
D. Emmett Thompson
ATTORNEY.

United States Patent Office 2,704,467
Patented Mar. 22, 1955

2,704,467

VIBRATION BALANCER

Charles B. Spase, Nedrow, N. Y., assignor to Lipe-Rollway Corporation, Syracuse, N. Y., a corporation of New York Application August 21, 1953, Serial No. 375,768

3 Claims. (Cl. 74—574)

This invention relates, in general, to vibration balancers, and is particularly useful in friction clutches connected to internal combustion engines. The vibration balancer embodies two inert parts mounted for movement about the axis of a rotating member, the parts being frictionally engaged with the rotating member to have a slipping action, and resilient means, as springs, functioning to yieldingly restrain movement of the inert parts relative to one another about the axis of the rotating member. A structure embodying this general arrangement is disclosed in my prior Patent No. 2,296,957, issued September 29, 1942.

This invention has as an object a vibration balancer of the type referred to embodying a structural arrangement whereby means is provided, as an over-running clutch, between one of the inert parts and the rotating member, to restrain movement of the inert part in one direction relative to the rotating member. This arrangement permits the one inert member, provided with the over-running clutch, to creep in the direction of movement of greatest severity and to permit the other free mounted inert member to act in contra-direction to such movement of greatest severity.

As above stated, the vibration balancer is intended particularly for use with mechanisms in which there is produced torsional vibration such, for example, as multi-cylinder internal combustion engines.

The invention consists in the novel features and in the combinations and constructions hereinafter set forth and claimed.

In describing this invention, reference is had to the accompanying drawings in which like characters designate corresponding parts in all the views.

In the drawings—

Figure 2:
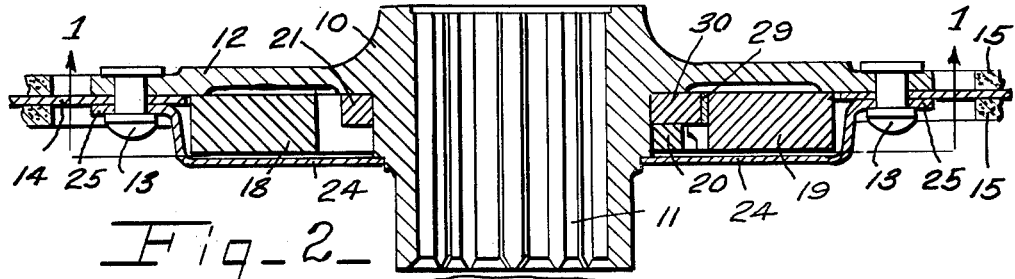
Figure 2 is a view taken on line 2—2, Figure 1.

The vibration dampener illustrated in the drawings is incorporated in an automotive clutch structure consisting of a driven hub portion 10 formed with internal splines 11 for connection to a driven clutch shaft. The hub 10 has a radial flange 12 to which there is affixed, by rivets 13, an annular clutch plate 14 provided on opposite sides 15 with friction surfaces for engagement with the driving member, which is usually the fly wheel of an internal combustion engine, when the clutch forms part of the drive mechanism for motor vehicles.

The vibration dampener structure per se consists of a pair of inert or inertia parts 18, 19, mounted upon the hub 10 and frictionally engaged therewith to have a slipping action. These inert parts 18, 19, are shown as segments of a disk, being of semi-discoidal contour, and each has a ring portion 20, 21, respectively, to provide a hub portion frictionally mounted on the hub 10. These hubs 20, 21, are substantially half the thickness of the members 18, 19, and these members are centrally recessed, whereby the hub portions 20, 21, are mounted on the clutch hub 10 in abutting side by side relation and the members 18, 19, extending radially in co-planar relation.

Figure 1:
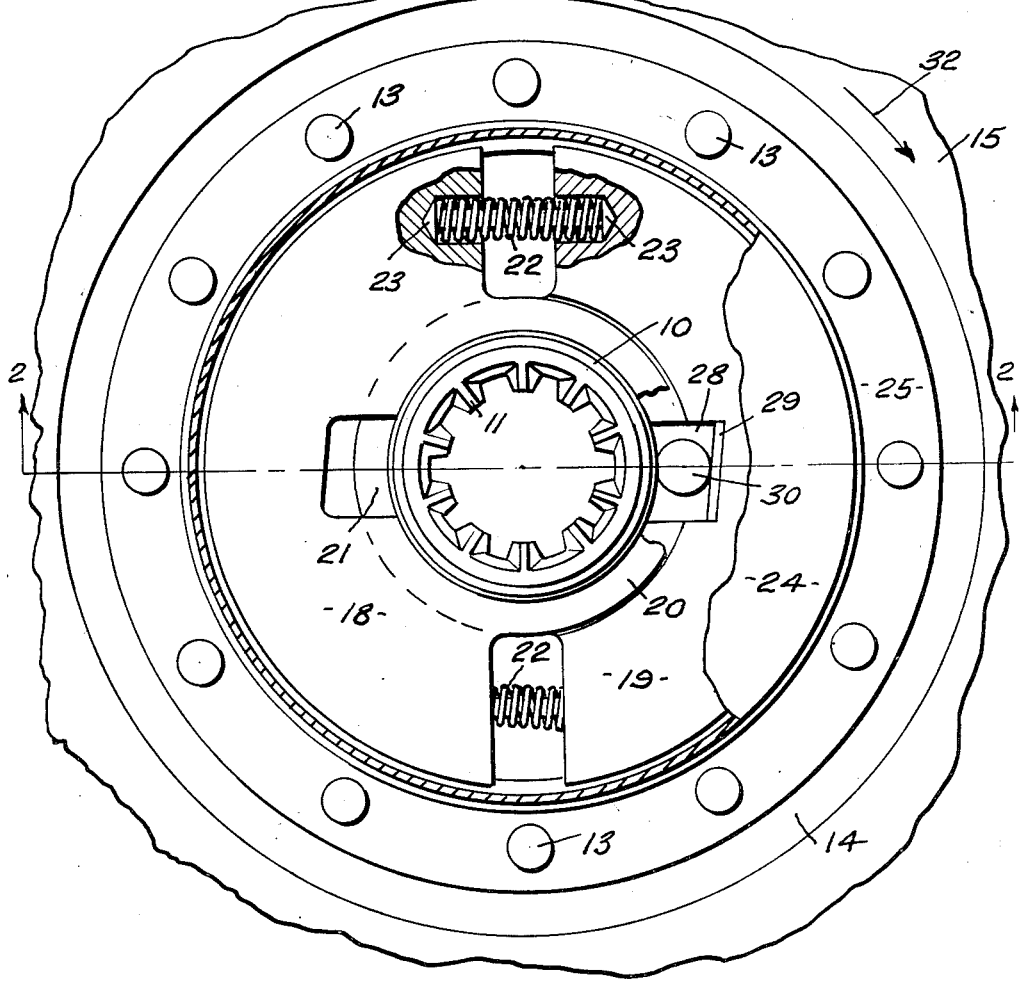
Figure 1 is a fragmentary elevational view of a clutch structure embodying my invention with parts broken away and parts shown in section.

The radially extending portions of the inert members 18, 19, are positioned on each side of a diameter of the unit in spaced apart relation and are yieldingly maintained in parallelism by springs 22, the ends of which are inserted in recesses 23 formed in the confronting edges of the portions 18, 19, see Figure 1. The springs 22 tend to increase the frictional engagement between the hub portions 18, 19, of the inert members, and the hub 10, and also this frictional engagement is increased by the centrifugal action of the weighted inert members. The members 18, 19, are located in an annular recess formed by a housing 24 having an offset portion 25 secured to the flange 12 by the rivets 13. In Figure 1, the housing 24 is broken, as indicated by line 1—1, Figure 2.

One of the inert members, as the member 19, is formed with a recess 28 extending radially outwardly from the bore of its hub member. A wear plate 29 is mounted in the bottom of the recess 28 and extends in angular relation to a radius extending from the center of the structure. A roller 30 is mounted in the recess 28 for engagement with the peripheral portion of the hub 10 and the wear plate 29. This structure constitutes an over-running clutch which permits movement of the inert member 19 in a clockwise direction Figure 1, as indicated by the arrow 32, but is effective to restrain the member 19 against counter-clockwise rotation. This permits the member 19 to creep in the direction of movement of greatest severity, and while maintained in this position, the other inert member 18 is free to separately move about the axis of the structure to balance out the vibration at that moment.

What I claim is:

1. The combination of a rotating member and a vibration balancer therefor including oppositely disposed inert parts rotatably mounted on said member concentrically therewith for movement circumferentially about the axis of the member, spring means connecting said parts and yieldingly restraining movement of one part relative to the other, and a roller clutch interposed between said rotating member and one of said inert parts and being operable to limit circumferential movement of said part in one direction relative to said rotating member.

2. The combination of a rotating member and a vibration balancer therefor including inert parts rotatably mounted on said member concentrically therewith to shift about the axis of said member, said parts comprising segments oppositely disposed in radial directions relatively to each other and having hubs frictionally engaged with said rotating member independently of each other to have a slipping action, the hub of one of said parts being formed with a recess extending radially from the rotating member, a roller mounted in said recess for engaging said rotating member and the bottom wall of said recess, said roller and recess forming an over-running clutch operable to restrain movement of said part in one direction circumferentially of said rotating member.

3. The combination of a rotating member and a vibration balancer therefor including inert parts rotatably mounted on said member concentrically therewith to shift about the axis of said member, said parts comprising segments oppositely disposed in radial directions relatively to each other and having hubs frictionally engaged with said rotating member independently of each other to have a slipping action, a over-running clutch structure interposed between said rotating member and the hub of one of said inert parts and being operable to restrain rotation of said part in one direction about the axis of said rotating member, and spring means operable to yieldingly restrain rotation of one of said inert parts relative to the other.

References Cited in the file of this patent

UNITED STATES PATENTS

| | | |
|---|---|---|
| 1,701,597 | Vincent | Feb. 12, 1929 |
| 1,844,991 | Thomas | Feb. 16, 1932 |
| 1,884,410 | Vincent | Oct. 25, 1932 |
| 2,296,957 | Spase | Sept. 29, 1942 |